United States Patent
Schlipf

(10) Patent No.: US 8,247,739 B2
(45) Date of Patent: Aug. 21, 2012

(54) TUBULAR HEATING ELEMENT WITH TEMPERATURE SENSOR

(75) Inventor: Andreas Schlipf, Tuttlingen (DE)

(73) Assignee: Türk & Hillinger GmbH, Tuttlingen (DE)

( * ) Notice: Subject to any disclaimer, the term of this patent is extended or adjusted under 35 U.S.C. 154(b) by 490 days.

(21) Appl. No.: 12/577,950

(22) Filed: Oct. 13, 2009

(65) Prior Publication Data

US 2010/0089893 A1    Apr. 15, 2010

(30) Foreign Application Priority Data

Oct. 15, 2008  (DE) .................. 20 2008 013 626 U

(51) Int. Cl.
*B67D 7/82*  (2010.01)
(52) U.S. Cl. ..... 219/264; 219/424; 219/535; 222/146.5; 264/328.15; 425/170; 425/549
(58) Field of Classification Search .......... 219/201, 219/264, 424–427, 535; 222/146.5; 264/328.15; 425/170, 549
See application file for complete search history.

(56) References Cited

U.S. PATENT DOCUMENTS

| | | | | | |
|---|---|---|---|---|---|
| 4,253,011 | A | * | 2/1981 | Hinz | 219/421 |
| 4,820,147 | A | * | 4/1989 | Gellert | 425/549 |
| 4,875,845 | A | * | 10/1989 | Hara et al. | 425/143 |
| 5,820,900 | A | * | 10/1998 | McGrevy | 425/549 |
| 6,897,418 | B1 | * | 5/2005 | Gunther | 219/543 |
| 8,066,505 | B2 | * | 11/2011 | Gunther et al. | 425/549 |
| 2006/0228440 | A1 | * | 10/2006 | Ernich | 425/549 |
| 2009/0214693 | A1 | * | 8/2009 | Holliday | 425/549 |
| 2010/0092595 | A1 | * | 4/2010 | Gunther | 425/170 |
| 2010/0233310 | A1 | * | 9/2010 | Feick | 425/549 |

FOREIGN PATENT DOCUMENTS

| | | |
|---|---|---|
| DE | 202006018576 U1 | 5/2008 |
| GB | 2 295 758 | 6/1996 |
| JP | 07088894 A * | 4/1995 |
| JP | 2002347095 A * | 12/2002 |
| WO | WO 2007/121823 A | 11/2007 |

* cited by examiner

*Primary Examiner* — Allan R Wilson
(74) *Attorney, Agent, or Firm* — McGlew and Tuttle, P.C.

(57) ABSTRACT

A heating element for metallic plastic injection nozzles with a tubular hollow metal body (2), which surrounds the nozzle body of an injection molding device in a heat-transmitting manner. The hollow body has an outer and/or inner jacket surface with one or more grooves (3, 4), extending in a thread-like manner at least in some sections, with inserted tubular heating body structure (with a heating body or bodies) (5). The heating body structure has electric terminals (6, 7) projecting away from the hollow body (2). In addition, a thermocouple, with a sensor tip (9) is in thermal contact with the material wall (15) of the plastic injection nozzle (17) in an end area of the tube wall, is arranged in a guide groove (4). To ensure that the temperature of the material tube, which temperature is to be regulated, is homogeneous at always the same measuring point and is shielded from the direct effect of heating, the sensor tip (9) is fixed in a heat-transmitting manner in a groove-like recess (11) of a tube wall section (20), which is thermally separated from the tube wall (2') by two front-side notches (21, 22) and which, being subject to a radial pressing force in a radially flexible manner, is in gap-free, two-dimensional thermal contact with the nozzle body (15).

14 Claims, 5 Drawing Sheets

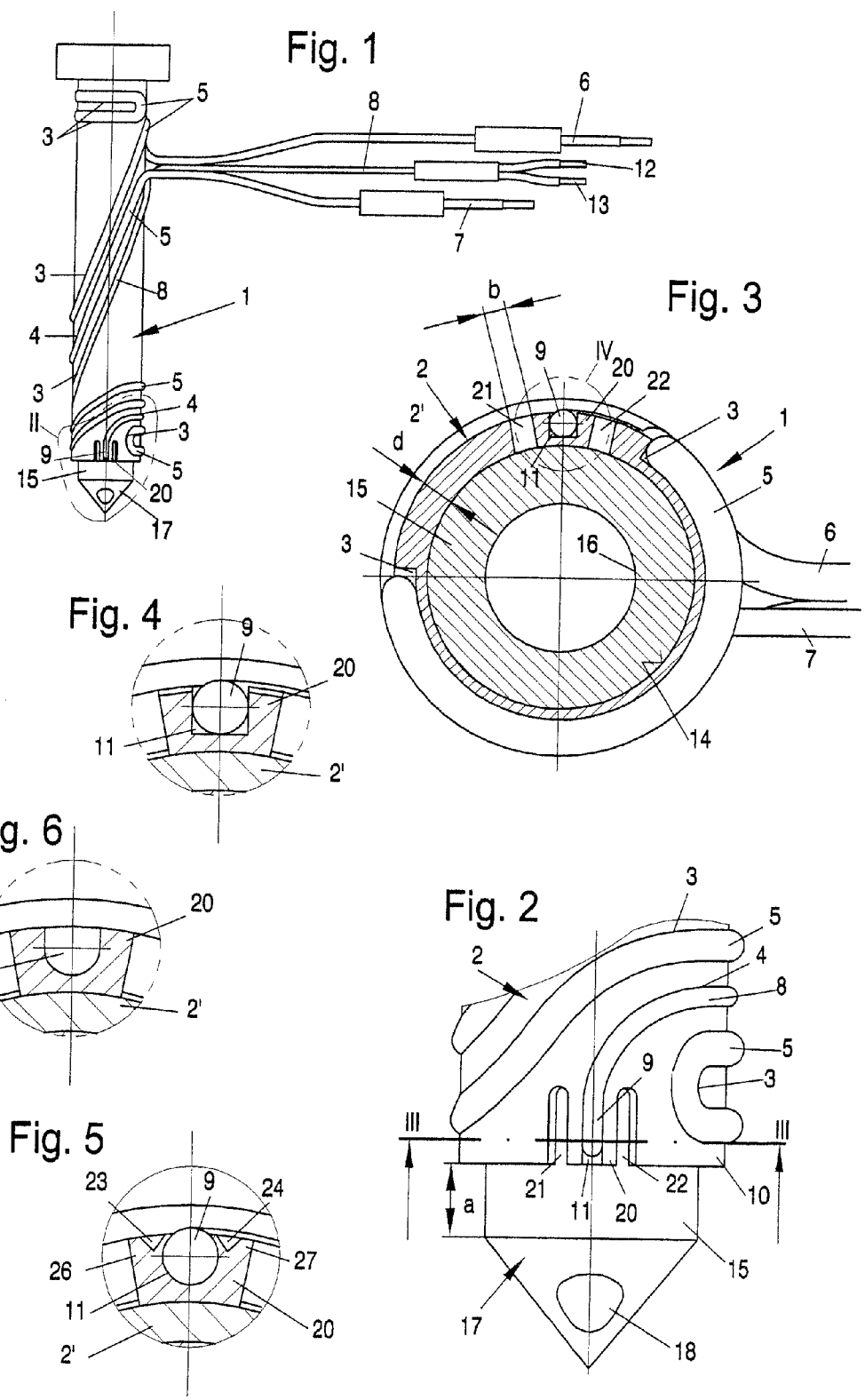

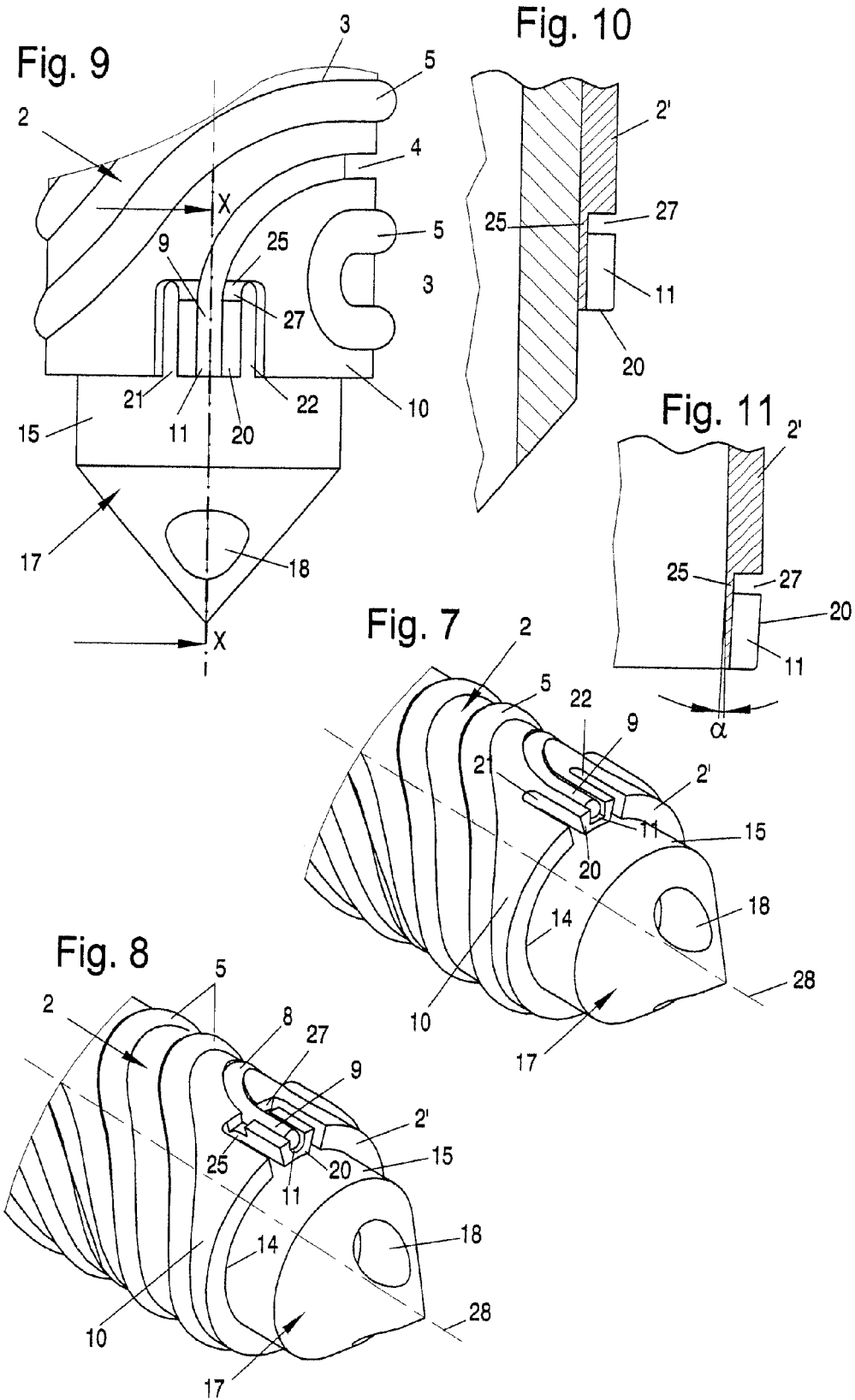

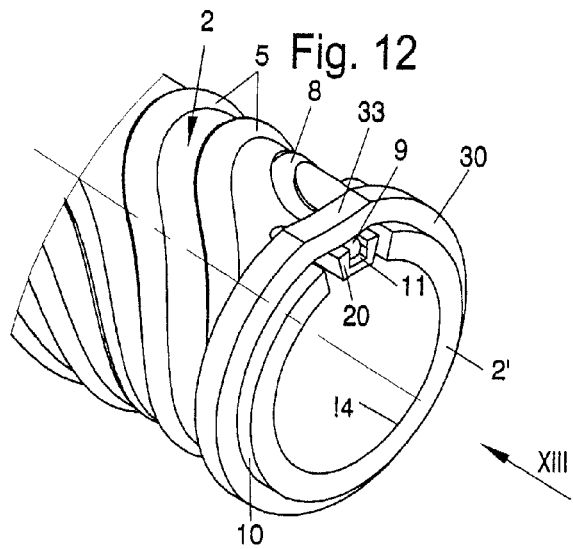
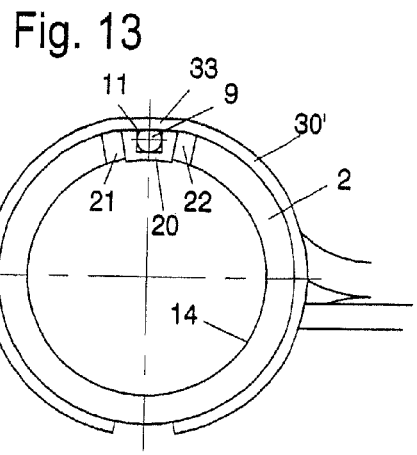
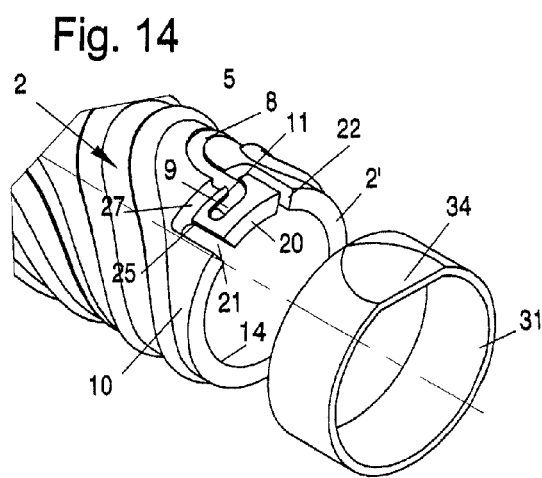
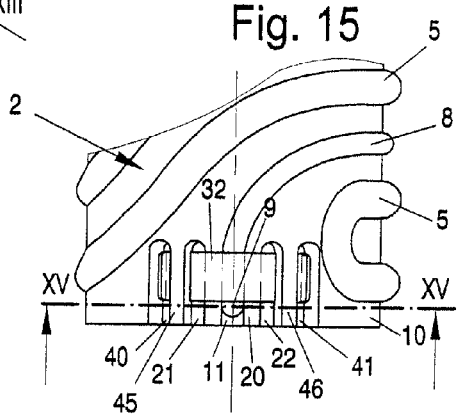
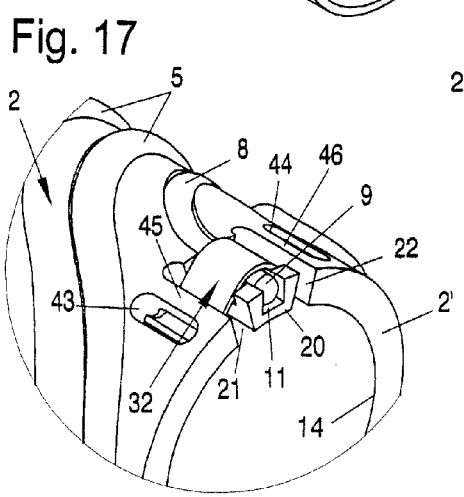
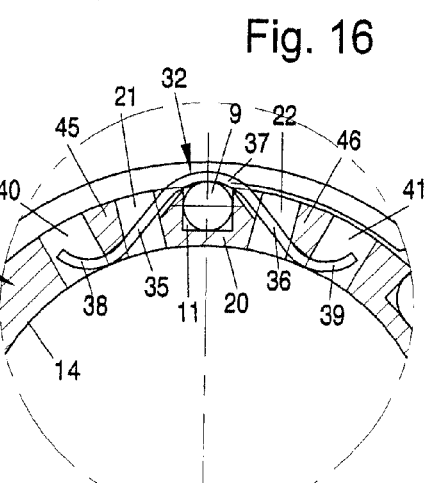
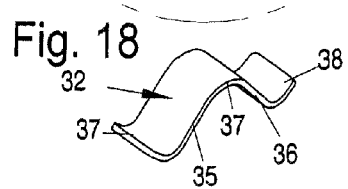

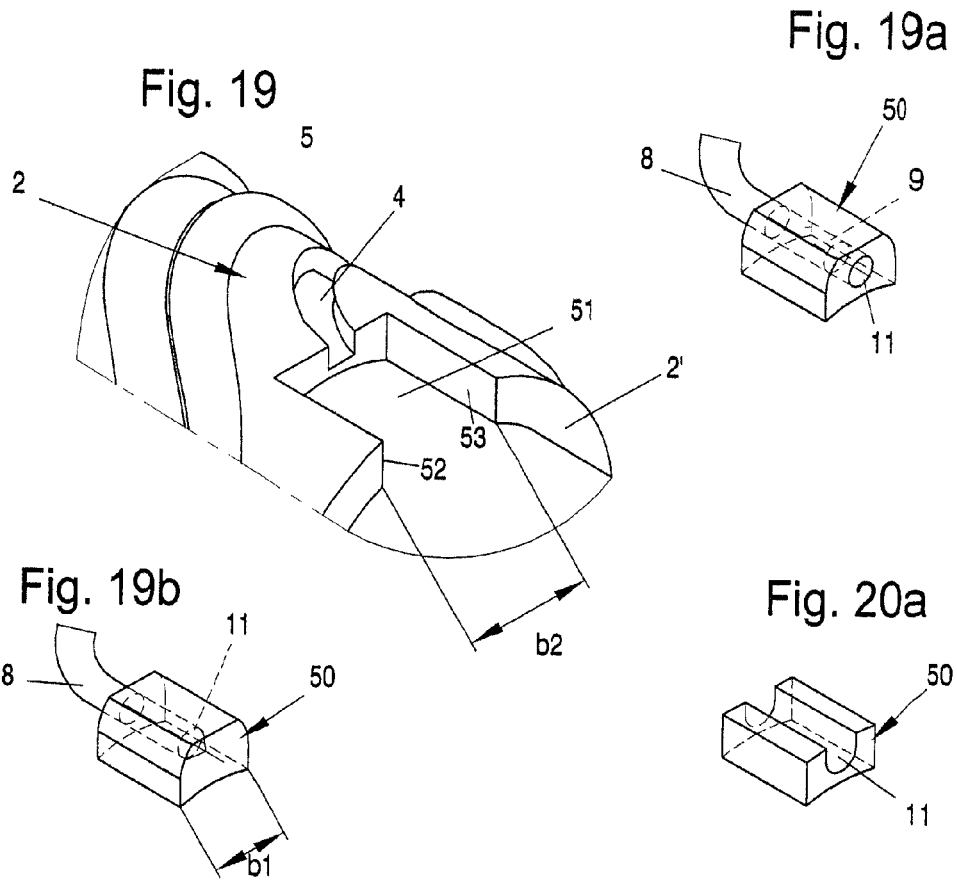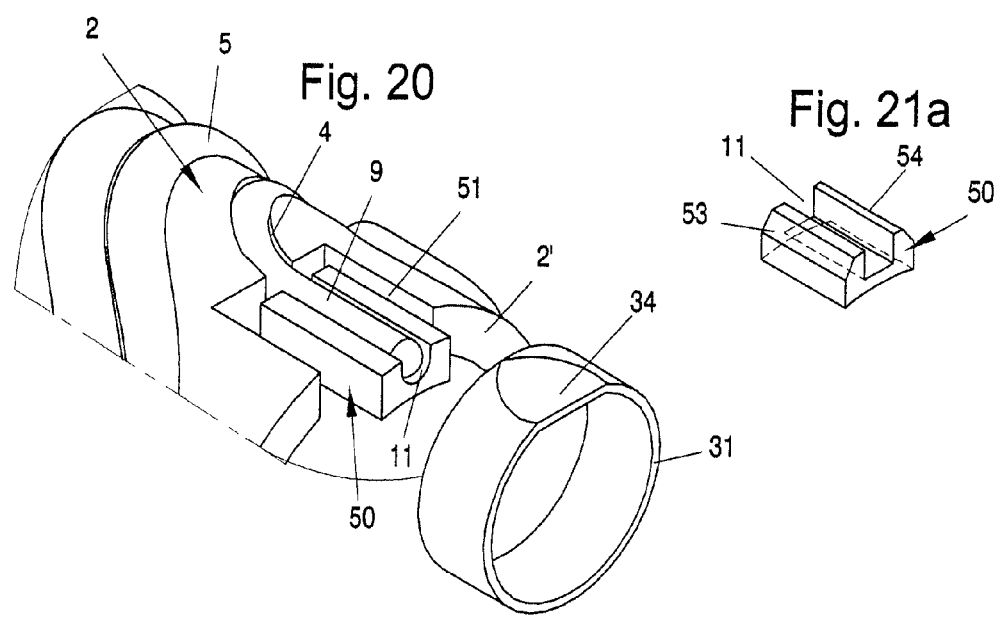

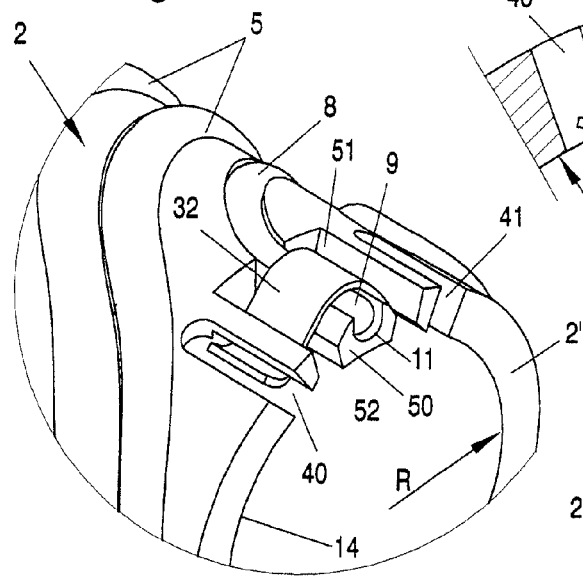
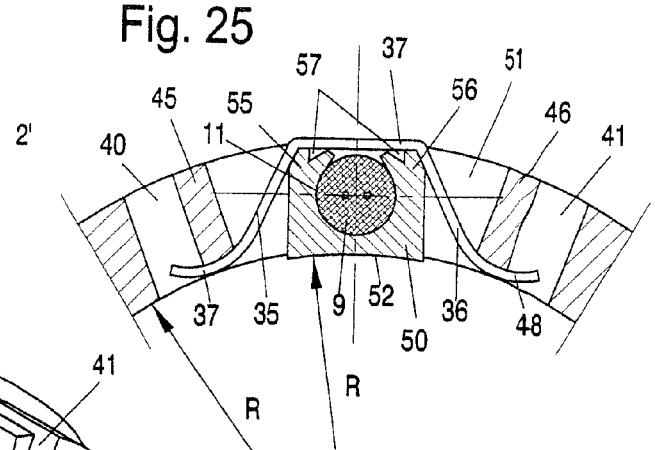
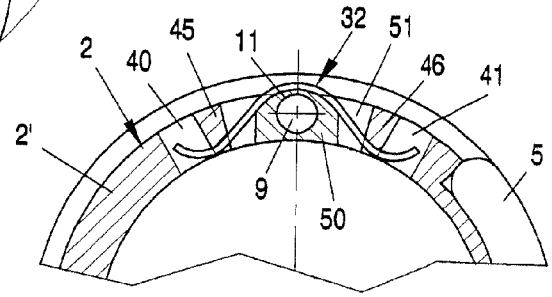
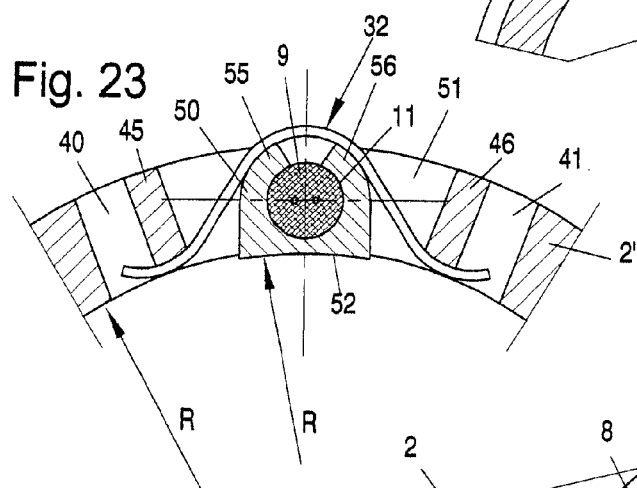
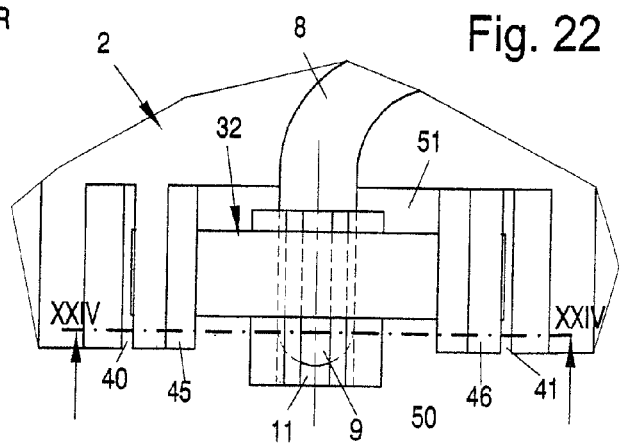

TUBULAR HEATING ELEMENT WITH TEMPERATURE SENSOR

CROSS REFERENCE TO RELATED APPLICATIONS

This application claims the benefit of priority under 35 U.S.C. §119 of German Patent Application DE 20 2008 013 626.1 filed Oct. 15, 2008, the entire contents of which are incorporated herein by reference.

FIELD OF THE INVENTION

The present invention pertains to a heating element, especially for plastic injection nozzles made of metal or the like, comprising a tubular hollow body consisting of metal, which surrounds a machine part to be heated, especially the nozzle body of an injection molding means, with its tube wall in a heat-transmitting manner, and which has one or more grooves extending in a thread-like manner at least in some sections with tubular heating body (bodies) inserted and/or pressed in, whose electric terminals project away from the hollow body, and with a thermocouple as a temperature sensor, which is guided in a guide groove of the tube wall and whose sensor tips are arranged in an end area of the tube wall such that they are in thermal contact with the plastic injection nozzle.

BACKGROUND OF THE INVENTION

Such heating elements are usually called hollow cartridges in this branch of industry. They are equipped with a coiled tube cartridge, which is pressed into circumferential grooves of a brass tube or CrNi steel tube. The circumferential grooves and the coiled tube cartridges pressed into same usually extend in a thread-like manner with different pitches to make it possible to set an adequate temperature distribution along the component to be heated. Such a component may be, e.g., a plastic injection nozzle. To obtain good heat transmission to the nozzle body of, e.g., such a plastic injection nozzle, the tube is provided with an accurately fitting internal diameter, i.e., with a fitting hole. The nozzle body itself, which is also called "material tube," may be provided with a one-layer, two-layer or multilayer tube wall.

A hot channel nozzle for an injection molding means designed as an injection mold, in which a tubular hollow body consisting of metal, which is pushed over the material tube of the nozzle body, is provided with a tubular heating body pressed into circumferential grooves, is known from DE 20 2006 018 576 U1. This hollow body, which is called a sleeve there, is also equipped with a temperature sensor, which is accommodated in a separate circumferential groove and which is needed as a temperature regulating means. The tube wall of the hollow body or of the sleeve is provided at one end with a radial passage opening. According to one embodiment, the free end, i.e., the tip of the temperature sensor, protrudes freely into this passage opening and is brought into contact with the material tube by means of a wave-shaped clamp. The two ends of the clamp are supported now on the inner edges of the passage opening, while their middle part surrounds the temperature sensor on the outside.

It shall thus be achieved that the free end of the temperature sensor, which acts as a measuring point, will not measure the temperature of the heated sleeve or of the heated hollow body, but will detect the temperature of the material tube of the nozzle.

Provisions are made in another embodiment for the end section of the temperature sensor to pass through a front-side recess of the sleeve or of the hollow body. The fixation or local fastening shall now be brought about by bonding, soldering or the like, or even by means of a clamp.

In all these types of embodiment, the rounded tip or the free hemispherical end of the temperature sensor is in contact with the material tube of the nozzle by a punctiform or at best linear contact, which is disadvantageous in terms of measurement technique because of the low heat transmission.

SUMMARY OF THE INVENTION

The basic object of the present invention is to provide a heating element of the type mentioned in the introduction, in which the arrangement of the tip of the thermocouple is fixed locally and thermally such that the temperature of the material tube of an injection molding nozzle, which temperature is to be regulated, is extensively homogeneous at always the same measuring point and is extensively shielded from the direct effect of the heating of the coiled tube cartridge.

Since these heating elements shall also be able to be replaced in a simple manner, it is also important that the thermal conditions, which had prevailed prior to the replacement or prior to the failure of the heating element replaced, can always be reset each time after such a hollow body heating element, provided with both a coiled tube cartridge and with a thermocouple, has been replaced.

This object is accomplished according to the present invention by the sensor tip being fixed in a heat-transmitting manner in a groove-like recess of a tube wall section, which is thermally separated from the tube wall laterally by at least two front-side notches and which is, being radially flexibly subject to a radial pressing force, in gap-free, two-dimensional thermal contact with the nozzle body.

With such an arrangement, which makes possible a two-dimensional temperature contact with always the same measuring point, faster, more accurate and more reliable temperature compensation can be achieved between the material tube (for example, of a plastic injection nozzle) and the temperature sensor as well as an even better temperature uncoupling from the heated sleeve or from the hollow body, in which the tubular heating body is integrated in a three-dimensionally and thermally coupled manner, can be achieved.

In addition, exchangeability is substantially more reliable in terms of guaranteeing equal measured parameters and hence of the preservation of unchanged controlled variables, because the mounting and fixation of the tip of the temperature sensor detecting the temperature to be measured changes only minimally at most due to the replacement.

Provisions are made in another solution, which guarantees the same advantages concerning the attainment of constant measured parameters, that the sensor tip is arranged in a recess of a separate contact element, which said recess surrounds at least the majority of its circumference in a heat-transmitting manner, and which said contact element is arranged separated from the tube wall on all sides in space in a wall section of the tube wall, wherein the contact element consists of a dimensionally stable material with good thermal conductivity, especially a metal, and, being subject to a radial pressing force, is in gap-free, two-dimensional contact with the circumference of the nozzle body.

There are a plurality of advantageous embodiment possibilities for both solutions as will be explained in more detail in the following description of the examples on the basis of the drawings. To simplify the description, the nozzle body is always provided with a simple (one-layer) tube wall only in the exemplary embodiments. Extrapolation of the embodiments according to the present invention to a multilayer tube wall is readily possible.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a complete side view showing a tubular heating element pushed over a hot channel nozzle or a plastic injection nozzle with snug fit with tubular heating body and thermocouple inserted into circumferential grooves;

FIG. 2 is an enlarged detail II from FIG. 1;

FIG. 3 is an enlarged view of a section III-III from FIG. 2;

FIG. 4 is a detail IV from FIG. 3;

FIG. 5 is a detail IV from FIG. 3, but with a different cross-sectional shape of the recess accommodating the sensor tip;

FIG. 6 is a detail IV from FIG. 3, but with a different cross-sectional shape of the recess accommodating the sensor tip;

FIG. 7 is a perspective view of the structure shown in FIG. 2;

FIG. 8 is a perspective view similar to FIG. 7 showing another embodiment of the tube wall section accommodating the sensor tip;

FIG. 9 is a top view showing the subject of FIG. 8;

FIG. 10 is a partial sectional view X-X from FIG. 9;

FIG. 11 is a sectional view according to section line X-X of the tube wall section accommodating the sensor tip;

FIG. 12 is a perspective view of the structure shown in FIG. 2 and of FIG. 7 with a retaining ring;

FIG. 13 is a front view XIII showing the hollow body with the retaining ring from FIG. 12;

FIG. 14 is a perspective view of the structure of FIG. 12 with another embodiment of the tube wall section accommodating the sensor tip and with another clamping element;

FIG. 15 is a top view of the lower section of the tubular heating element, which section corresponds to the view in FIG. 2, with another clamping element for the tube wall section accommodating the sensor tip;

FIG. 16 is an enlarged view showing a partial section XVI-XVI from FIG. 15;

FIG. 17 is a perspective view showing the structure of claim 15 with other recesses for receiving the ends of the clamping element;

FIG. 18 is a perspective view showing the clamping element according to FIGS. 15 through 17 as an individual part;

FIG. 19 is a perspective view of a front-side part of a tube wall of the heating element, which tube wall is provided with a cut-out;

FIG. 19a is a perspective view of a contact element fitting the cut-out as an individual part with inserted sensor tip;

FIG. 19b is a perspective view showing another embodiment of the contact element from FIG. 19a, likewise with an inserted sensor tip;

FIG. 20 is a perspective view showing the same view as FIG. 19 with a contact element, which is inserted into the cut-out and accommodates the sensor tip;

FIG. 20a is a perspective view showing the contact element from FIG. 20 as an individual part;

FIG. 21 is a perspective view showing a tube section from FIG. 19 with another contact element as well as with a clamping element from FIG. 18;

FIG. 21a is a perspective view showing the contact element from FIG. 21 as an individual part;

FIG. 22 is a top view showing the structure of FIG. 21;

FIG. 23 is a sectional view of section XXIII-XXIII from FIG. 22;

FIG. 24 is a sectional view according to section line XXIII-XXIII from FIG. 2, but with another cross-sectional shape of the contact element; and FIG. 25 is a sectional view corresponding to FIGS. 23 and 24 of another cross-sectional shape of the contact element and of the clamping element.

DESCRIPTION OF THE PREFERRED EMBODIMENTS

Referring to the drawings in particular, the heating element 1 shown in the drawings, which is also called hollow cartridge in the industry in this embodiment shown, comprises a tubular, cylindrical hollow body 2 consisting of metal, preferably brass or CrNi steel. This hollow body 2 is provided on its circumferential surface with grooves 3 and 4, which extend in a thread-like manner and in parallel to one another and which have different pitches distributed over the length of the hollow body 2. The pitches are small in the end areas of the hollow body 2 and great in the middle area. A coiled tube cartridge 5, whose terminals 6 and 7 are led out radially to the outside in the upper area of the hollow body 2, is pressed into the contiguous groove 3. A thermocouple acting as a temperature sensor 8, whose sensor tip 9 is located in a recess 11 at one end 10 of the hollow body 2, is placed into the groove 3.

The two terminals 12 and 13 of the temperature sensor 8 are guided in space together with the two terminals 6 and 7 of the coiled tube cartridge 5 such that they radially project from the hollow body 2.

The hollow body 2 is provided with a fitting hole 14, which accommodates the material wall 15 of a plastic injection nozzle 17 provided with a flow channel 16 gap-free and in a heat-transmitting manner. The heating element 1, i.e., the hollow body 2 with the coiled tube cartridge 5 and with the temperature sensor 8, is placed on or pushed replaceably over the material wall 15 of the plastic injection nozzle 17 such that the end section 10 of the hollow body 2, in which the sensor tip 9 is located, has an exactly defined distance a from the conical end 19 of the plastic injection nozzle 17, which said end is provided with discharge openings 18, in order for the temperature prevailing at this measuring point of the plastic injection nozzle 17 during the injection operation to be detected by the sensor tip 9 as accurately as possible and to be able to be used for temperature regulation.

Recess 11, in which the sensor tip 9 is fixed in a heat-transmitting manner, is located in a tube wall section 20, which is thermally separated laterally from the tube wall 2' of the hollow body 2 by two front-side notches 21 and 22. Due to these two notches 21 and 22, the tube wall section 20 with its recess 11 acquires a certain elastic flexibility, so that, being subject to a radial pressing force, it is in heat-transmitting contact with the nozzle body, i.e., the material wall 15 of the plastic injection nozzle 17, by a gap-free, two-dimensional contact.

The radial pressing force can be brought about in different ways, It is possible, for example, as is shown in FIG. 11, to bend the tube wall section 20 with a clamping angle α of about 2° to 3° to the inside before the hollow body 2 is pushed over the injection nozzle 17 or the tube wall 2', so that a radial stress, i.e., the desired radial pressing force, will act.

In the exemplary embodiment shown in FIGS. 1 through 7, recess 11 forms an axially extending extension and hence the end section of the guide groove 4 of the thermocouple or temperature sensor 8, which said groove extends in the circumferential surface of the tube wall 2'. Instead of imparting a rectangular cross-sectional shape, as is shown in FIGS. 4 and 7, to the recess 11, it is more advantageous to select a U-shaped cross-sectional shape according to FIG. 6. An even better heat transfer is achieved between the tube section 20 and the sensor tip 9 by notches 23 and 24, according to FIG. 5, which are prepared on the outside in the two edge spring legs 26 and 27 of recess 11. Due to these edge spring legs, the sensor tip 9 is surrounded by the material of the tube wall section 20 in an extensively contacting manner and substantially better heat transfer is thus also achieved between the these two parts. The cross sections of the recess 11 and of the sensor tip 9 are adapted here to one another such that they engage each other by contact.

In the exemplary embodiment according to FIGS. 8 through 11, the cut-out tube wall section 20 is connected to the tube wall 2' by a connection web 25 located between the two notches 21 and 22. This connection web 25 has a reduced cross section compared to the thickness of the tube wall 2'. This connection web 25 with the reduced cross section is prepared by preparing a cross groove 27. Extensive thermal uncoupling of the tube wall section 20 from the hollow body 2 or from the tube wall 2' thereof is achieved by this cross section reduction. In addition, the tube wall section 20 can be bent radially inwardly more easily due to this cross section reduction in order to make possible a better heat transmission between the plastic injection nozzle 17 and the sensor tip 9.

If recess 11 has a U-shaped cross section, it is also possible to bend the originally straight spring leg ends against each other around the guide tip 9 in a positive-locking manner in order to obtain a better contact flow with a larger contact area and hence better heat transmission between the wall section 20 and the sensor tip 9.

At the same time, permanent fixation of the sensor tip 9 in the recess 11 is achieved by such a connection based on engagement by contact.

Sufficiently effective thermal uncoupling of the tube wall section 20 from the rest of the hollow body 2 or tube wall 2' is achieved if the notches 21 and 22 have a width b each, which corresponds to at least half the thickness d of the tube wall 2'.

FIGS. 12 through 17 show exemplary embodiments, in which the radial pressing force, which presses the cut-out tube wall section 20 together with the sensor tip 9 accommodated in the recess 11 thereof radially inwardly, is exerted by a spring element. This spring element may comprise, for example, a retaining ring 30 according to FIGS. 12 and 13 or a clamping sleeve 31 according to FIG. 14 or a wave- or strap-shaped spring steel sheet 32 according to FIGS. 15, 16 and 17.

Retaining ring 30 may be designed as a closed ring and provided with a radial flattened area or inflection 33. However, it is also possible to use a retaining ring 30' according to FIG. 13, which is open on the underside and whose inflection 33, which is on the top side (in the example), elastically presses the tube wall section 20 inwardly.

It would also be possible to use with the same effect a ring clamp made of spring steel sheet, which surrounds the circumference of the hollow body 2 in the area of the end section 10 thereof over more than 180°, with a shape corresponding to the flattened area or inflection.

As is apparent from FIG. 14, the clamping sleeve 31 is also provided with a flattened area 34, by which the radial pressing force is applied to the cut-out tube wall section 20 and the sensor tip 9 located in the recess 11 thereof when the clamping sleeve 31 is pushed over the end section 10 of the hollow body 2. Recess 11 is arranged in this embodiment with the sensor tip 9 inserted or pressed in such that it extends in the circumferential direction. Wall section 20 has a greater width here than in the other exemplary embodiments.

It may be advantageous precisely in this embodiment with the broader tube wall section 20 to provide the connection web 25 produced by the cross groove 27 with the reduced cross section in order to achieve a more effective thermal uncoupling from the hollow body 2, on the one hand, and greater flexibility, on the other hand.

The spring steel sheet 32 shown in FIGS. 15 through 18, which acts as a spring element, is made in one piece. It has two straight spring legs 35 and 36, which extend approximately at right angles or at an acute angle in relation to one another and which are connected elastically to one another by a semicircular arch 37. The ends 38 and 39 of the spring legs 35 and 36 are bent outwardly and backwardly each. In the installed state of the spring steel sheet 32, the spring legs 35 and 36 thereof pass through the notches 21 and 22, and the semicircular arch 37 surrounds the tube wall section 20 with the sensor tip 9 mounted therein on the outside and exerts an inwardly directed pressing force in the process. To receive the outwardly bent ends 37 and 38 of the spring steel sheet 32, the tube wall 2' is provided with additional notches 40 and 41 or slot-like cut-outs 43 and 44 each, which are arranged such that finger- or rib-like webs 45 and 46, at which the ends 37 and 38 of the spring steel sheet 32 are elastically supported on the inside, are formed between the notches 21 and 22, on the one hand, and the notches 40 and 41 or the slot-like recesses 43 and 44.

To prevent the ends 37 and 38 from protruding into the fitting hole 14 of the hollow body 2 or of the tube wall 2' and also from coming into contact with the nozzle body, webs 45 and 46 are provided with corresponding respective cut-outs 48 and 49 on the inside.

In the exemplary embodiments according to FIGS. 19 through 26, recess 11, which accommodates the sensor tip 9 at least approximately completely, surrounding same in a heat-transmitting manner, is arranged in a separate contact element 50, which is arranged in a wall cut-out 51 of the tube wall 2' separated from the tube wall 2' on all sides in space.

As is shown in FIGS. 20a, 21a as well as 23 through 27, this contact element 50 may have different cross-sectional shapes and also recesses 11 with different cross sections. However, a possibly gap-free contact, which guarantees good heat transmission from the plastic injection nozzle, i.e., from the part of an injection mold or the like, which part is to be heated, to the sensor tip 9, is provided in all embodiments. In addition, the outer shape of this contact element 50 is selected to be such that it can be inserted into the wall cut-out 51 of the tube wall 2' without coming into contact with the tube wall 2' itself and without having a sufficient distance from this on all sides.

Even better thermal separation is guaranteed between the hollow body 2 or the tube wall 2' thereof and the sensor tip 9 with such separate contact elements 50. The wall cut-out 51 in the tube wall 2' is advantageously open on the front side and is arranged such that the guide groove 4, which guidingly accommodates the thermocouple or the temperature sensor 8, opens at least approximately centrally into the wall cut-out 51, so that the contact element 50 is likewise placed, as is shown in FIGS. 20 through 25, in the wall cut-out 51 and can have equal distances from the lateral limiting surfaces 42 and 43 of the wall cut-out 51.

In this case, as in other exemplary embodiments as well, the sensor tip 9 extends coaxially with the axis of the hollow body 2. The prerequisite for the contactless arrangement of contact element 50 in the wall cut-out 51 is, of course, that the width b2 of the wall cut-out 51 is greater than the width b1 of the contact element 50. To make possible a possibly gap-free and two-dimensional contact of the contact element 50 extending over the entire width b1 on the circumference of the plastic injection nozzle 17, the inner surface 52 of the contact element 50 is arched concavely, the radius of curvature R (FIGS. 23 and 25) corresponding to that of the fitting hole 14 of the hollow body 2.

As is apparent from FIG. 20, the contact element 50 may be shaped and arranged such that it protrudes from the wall cut-out 51, which is open on the front side.

To achieve that the contact element 50 is pressed with a certain radial pressing pressure onto the circumference of the material wall 15 of the plastic injection nozzle 17, a clamping sleeve 31 is provided in the embodiment according to FIG. 20 with a flattened area 34, which is pushed over the end 10 of the hollow body 2. Similarly to the embodiments according to FIGS. 15 through 17, spring steel sheets 32 are provided as clamping elements in the embodiments according to FIGS. 21 through 25. To make it possible to use such spring steel sheets 32 as clamping elements, it is necessary, as in the embodiments according to FIGS. 15 through 17, to provide the tube wall 2' with notches 40 and 41, which can accommodate the lower, outwardly and backwardly bent ends 38 and 39 and form the webs 45 and 46, on the undersides of which the ends 38 and 39 of the spring steel sheets 32 can be supported.

FIG. 25 shows an embodiment of the spring steel sheet 32, which has, instead of the semicircular arch 37, a flat connection piece 37', which connects the two spring legs 35 and 36 to one another and is elastically in contact with the contact element 50.

As is shown in FIGS. 20a and 21a, the recesses 11 of the contact element 50 may have a U-shaped or rectangular cross section. The lateral upper end edges of the contact element 50 are each rounded in the embodiments according to FIGS. 26 and 27. The upper end edges are replaced by obliquely extending bevels 43 and 44 in the exemplary embodiment according to FIG. 21, just as in the contact element 50 according to FIG. 21. The lateral edge webs 55 and 56 of the originally U-shaped recess 11 are provided in the contact element 50 according to FIG. 25 with notches 57 each, by means of which better enclosure of the sensor tip is achieved. The two edge webs 55 and 56 as a whole are bent inwardly in relation to one another in the embodiment according to FIG. 23 in order to achieve an extensive enclosure of the cylindrical sensor tip 9.

In the embodiments according to FIGS. 19a, 19b and 24, the sensor tip 9 protrudes into a recess 11 each of the contact element 50 shown as an individual part in FIG. 19a and FIG. 19b, which said recess is designed as an axial hole. The recess may be designed as a through hole (FIG. 19a) or as a blind hole (FIG. 19b). It may also be advantageous to press the contact element 50 radially on the sensor tip 9 in order to achieve optimal heat transfer. Good fixation and a stable connection between the contact element 50 and the sensor tip 9 would thus be guaranteed at the same time as well. Non-positive fixing of the contact element 50 on the sensor tip 9 can also be achieved by the material of the contact element 50, which has good thermal conductivity, having a lower coefficient of thermal expansion than the material of the metallic jacket of the sensor tip.

In all exemplary embodiments shown and described, the sensor tip 9 is embedded in a heat-transmitting manner in a recess 11 of a wall section 20 of the hollow body or of a contact element 50, which are thermally extensively separated from the hollow body carrying the "heater," but guarantee good heat transmission from the measuring point of the plastic injection nozzle 17 to the sensor tip. The cross-sectional shape of both the recess 11 and the wall section 20 or of the contact element 50 may vary appropriately.

Finally, it shall be noted that the heating element according to the present invention is intended not only for use in connection with a plastic injection nozzle. This heating element may rather be used wherever regulated heating or tempering of a correspondingly shaped component is necessary.

While specific embodiments of the invention have been described in detail to illustrate the application of the principles of the invention, it will be understood that the invention may be embodied otherwise without departing from such principles.

What is claimed is:

1. A heating element for metallic plastic injection nozzles or the like, the heating element comprising:
    a tubular metal hollow body having a tube wall for surrounding a nozzle body of an injection molding device in a heat-transmitting manner, said tubular metal hollow body having one or more grooves extending in a thread-like manner in at least some sections in an outer and/or inner jacket surface of the tube wall;
    a tubular heating body structure with one or more tubular bodies inserted and/or pressed in said one or more grooves, said tubular heating body structure having electric terminals projecting away from said hollow body;
    a thermocouple as a temperature sensor guided in one of said one or more guide grooves of said tube wall, said temperature sensor having a sensor tip arranged in an end area of said tube wall such that said sensor tip is in thermal contact with a material wall of the plastic injection nozzle, said tube wall including a tube wall section with a U-shaped groove thermally separated laterally from a remainder of the tube wall by at least two front-side notches, said tube wall section being radially flexibly and resilient and compressed by a radial surface force from a gap-free thermal contact fitting of said tube wall section on the nozzle body, said sensor tip being fixed in a heat-transmitting manner in said groove-like recess.

2. A heating element in accordance with claim 1, wherein said groove-like recess of said radially flexible tube wall section forms an end section of said guide groove of said thermocouple, said guide groove extending in a circumferential surface of said tube wall.

3. A heating element in accordance with claim 1, wherein a cross sections of said recess and of said sensor tip are adapted to one another such that they engage each other by contact.

4. A heating element in accordance with claim 1, wherein said radially flexible tube wall section is connected to said tube wall by a web located between said two notches and has a reduced cross section.

5. A heating element in accordance with claim 1, wherein said notches each have a width corresponding to at least half a thickness of said tube wall.

6. A heating element in accordance with claim 5, wherein said recess has a U-shaped cross section and that the originally straight leg ends are bent in relation to one another around the sensor tip in a positive-locking manner.

7. A heating element in accordance with claim 1, wherein a radial outer side of the sensor tip and/or the radially flexible tube wall section is/are in contact with a spring element, said spring element being supported at the tube wall and exerting a radially inwardly directed pressure on the flexible tube wall section and/or the sensor tip.

8. A heating element in accordance with claim 7, wherein the spring element consists of a wave-shaped spring steel sheet extending through the two notches, said wave-shaped spring steel sheet ends being supported on the inside on the tube wall.

9. A heating element in accordance with claim 7, wherein the spring element comprises a retaining ring surrounding the end section of the tube wall and the radially flexible tube wall section or a clamping sleeve.

10. A heating element for metallic plastic injection nozzle, the heating element comprising:
- a tubular metal hollow body with a tube wall surrounding a nozzle body of an injection molding device in a heat-transmitting manner, said hollow body having one or more grooves extending in a thread-like manner at least in some sections in an outer and/or inner jacket surface of the tube wall;
- a tubular heating body structure with one or more tubular heating bodies inserted and/or pressed in said one or more grooves, said tubular heating body structure having electric terminals projecting away from said hollow body;
- a thermocouple as a temperature sensor guided in said one or more grooves of the tube wall and with a sensor tip arranged in an end area of the tube wall such that it is in thermal contact with the material wall of the plastic injection nozzle; and
- a separate contact element, said sensor tip being arranged in a recess of said separate contact element, said recess surrounding at least a majority a circumference of said sensor tip in a heat-transmitting manner, said contact element being arranged in a wall cut-out of said tube wall, separated in space on all sides from said tube wall, wherein said contact element is formed of a dimensionally stable material with good thermal conductivity, is subject to a radial pressing force, and is in a gap-free, two-dimensional thermal contact with the circumference of the nozzle body.

11. A heating element in accordance with claim 10, wherein the wall cut-out of the tube wall is open on the front side and the separate contact element projects from the wall cut-out of the tube wall on the front side.

12. A heating element in accordance with claim 10, wherein the recess of the separate contact element comprises a blind hole extending in an extension of the guide groove of the thermocouple.

13. A heating element in accordance with claim 10, wherein the separate contact element consists of a material whose coefficient of thermal expansion is lower than the coefficient of thermal expansion of the sensor tip.

14. A heating element in accordance with claim 10, wherein the separate contact element is pressed to the sensor tip.

\* \* \* \* \*